United States Patent
Hironaka

(10) Patent No.: US 9,856,992 B2
(45) Date of Patent: Jan. 2, 2018

(54) SOLENOID VALVE

(71) Applicant: KYB Corporation, Tokyo (JP)

(72) Inventor: Tsuyoshi Hironaka, Tokyo (JP)

(73) Assignee: KYB Corporation, Tokyo (JP)

(*) Notice: Subject to any disclaimer, the term of this patent is extended or adjusted under 35 U.S.C. 154(b) by 0 days.

(21) Appl. No.: 15/126,013

(22) PCT Filed: Jun. 23, 2015

(86) PCT No.: PCT/JP2015/068025
§ 371 (c)(1),
(2) Date: Sep. 14, 2016

(87) PCT Pub. No.: WO2016/006436
PCT Pub. Date: Jan. 14, 2016

(65) Prior Publication Data
US 2017/0175915 A1   Jun. 22, 2017

(30) Foreign Application Priority Data

Jul. 8, 2014 (JP) ................................. 2014-140621

(51) Int. Cl.
*F16K 31/06* (2006.01)
*H01F 7/16* (2006.01)

(52) U.S. Cl.
CPC .............. *F16K 31/06* (2013.01); *H01F 7/16* (2013.01)

(58) Field of Classification Search
CPC .................................... F16K 31/06; H01F 7/16
USPC .............................................. 251/129.15, 337
See application file for complete search history.

(56) References Cited

U.S. PATENT DOCUMENTS

| 4,635,683 | A | * | 1/1987 | Nielsen | ..................... | H01F 7/13 |
| | | | | | | 251/129.15 |
| 5,868,167 | A | * | 2/1999 | Miki | ................... | F16H 61/0251 |
| | | | | | | 137/625.65 |
| 6,273,396 | B1 | * | 8/2001 | Kato | .................... | F16K 31/0655 |
| | | | | | | 251/129.21 |
| 6,688,334 | B2 | * | 2/2004 | Kawamura | ......... | F16K 31/0613 |
| | | | | | | 137/625.65 |
| 7,412,989 | B2 | * | 8/2008 | Segi | .................... | F16K 31/0613 |
| | | | | | | 137/625.64 |
| 7,748,683 | B1 | * | 7/2010 | Kelly | ................... | F16K 31/0655 |
| | | | | | | 251/129.08 |

(Continued)

FOREIGN PATENT DOCUMENTS

DE        10249559 A1    5/2004
EP         0560768 A1    9/1993

(Continued)

*Primary Examiner* — John Bastianelli
(74) *Attorney, Agent, or Firm* — Rabin & Berdo, P.C.

(57) ABSTRACT

A solenoid valve includes a housing having a cylindrical shape and having a valve path, a spool adjusting an opening degree of the valve path, a coil producing a magnetic force when a current passes therethrough, a first and a second stator core excited by the magnetic force of the coil, a shaft configured to be movable along axial direction together with the spool, a plunger fixed to the shaft and moving in the axial direction by adsorption force acting between itself and the first stator core by the magnetic force of the coil, and a coil spring biasing the spool against the adsorption force acting on the plunger. A spring constant of the coil spring increases as the adsorption force increases by the movement of the plunger.

4 Claims, 6 Drawing Sheets

(56) References Cited

U.S. PATENT DOCUMENTS

| | | | |
|---|---|---|---|
| 7,909,060 B2* | 3/2011 | Yamamoto | G05D 16/2026 137/625.6 |
| 2001/0029985 A1* | 10/2001 | Jansen | F15B 13/0402 137/625.65 |

FOREIGN PATENT DOCUMENTS

| | | |
|---|---|---|
| JP | S56-116968 A | 9/1981 |
| JP | 2012-229738 A | 11/2012 |

* cited by examiner

SOLENOID VALVE

TECHNICAL FIELD

The present invention relates to a solenoid valve.

BACKGROUND ART

With a solenoid valve, an adsorption force toward a stator core is produced for a plunger by a magnetic force of a coil, and a spool is moved by equilibrium between the adsorption force acting via the plunger and a biasing force by a spring member.

JP2012-229738A discloses such a solenoid valve that is provided with a sleeve having a plurality of fluid passages in a cylindrical wall, a fixed core engaged integrally with the sleeve via a body, a spool reciprocating inside the sleeve to switch between the fluid passages, a plunger arranged in series with the spool in the axial center direction and fitted to and inserted into the body to be able to slide, a case holding a cylindrical core supporting the plunger and a coil applying an electromagnetic force, and a spring biasing the spool to the side of the plunger.

SUMMARY OF INVENTION

With the solenoid valve in general, the adsorption force acting between the stator core and the plunger rapidly increases, in the area where the plunger approaches to the stator core to the vicinity of the position where the plunger abuts against the stator core.

In such an area, the adsorption force rapidly increases even by slight movement of the plunger, and therefore it is difficult to control the spool in the solenoid valve. For this reason, the area where the adsorption force rapidly increases cannot be used as the area where the plunger is allowed to move for the control of the spool, and this area is regarded as a useless movable area for the control of the spool.

The present invention has an object to provide a solenoid valve that useless movable area of the plunger is reduced.

According to one aspect of the present invention, a solenoid valve for controlling a flow rate of working fluid includes a housing having a valve path in which the working fluid flow; a spool movably provided inside the housing and configured to adjust an opening degree of the valve path; a coil configured to produce a magnetic force when a current passes therethrough; a stator core provided inside the coil and configured to be excited by the magnetic force of the coil; a shaft configured to be movable along axial direction together with the spool; a plunger fixed to the shaft and configured to move in the axial direction by adsorption force acting between the plunger and the stator core by the magnetic force of the coil; and a spring member configured to bias the spool against the movement of the plunger. A spring constant of the spring member increases as the adsorption force increases by the movement of the plunger.

DESCRIPTION OF EMBODIMENTS

Hereinafter, embodiments of the present invention will be explained with reference to the drawings.

A solenoid valve controls a flow rate of working fluid that is guided from a fluid pressure source (not illustrated) to a fluid pressure apparatus (not illustrated) or the like. In the following embodiments, explanations are given supposing that hydraulic oil is used as the working fluid. The working fluid is not limited to the hydraulic oil, and may be other non-compressive fluid or compressive fluid.

(First Embodiment)

First, the entire structure of a solenoid valve 100 according to a first embodiment of the present invention will be explained with reference to FIG. 1.

Figure 1:
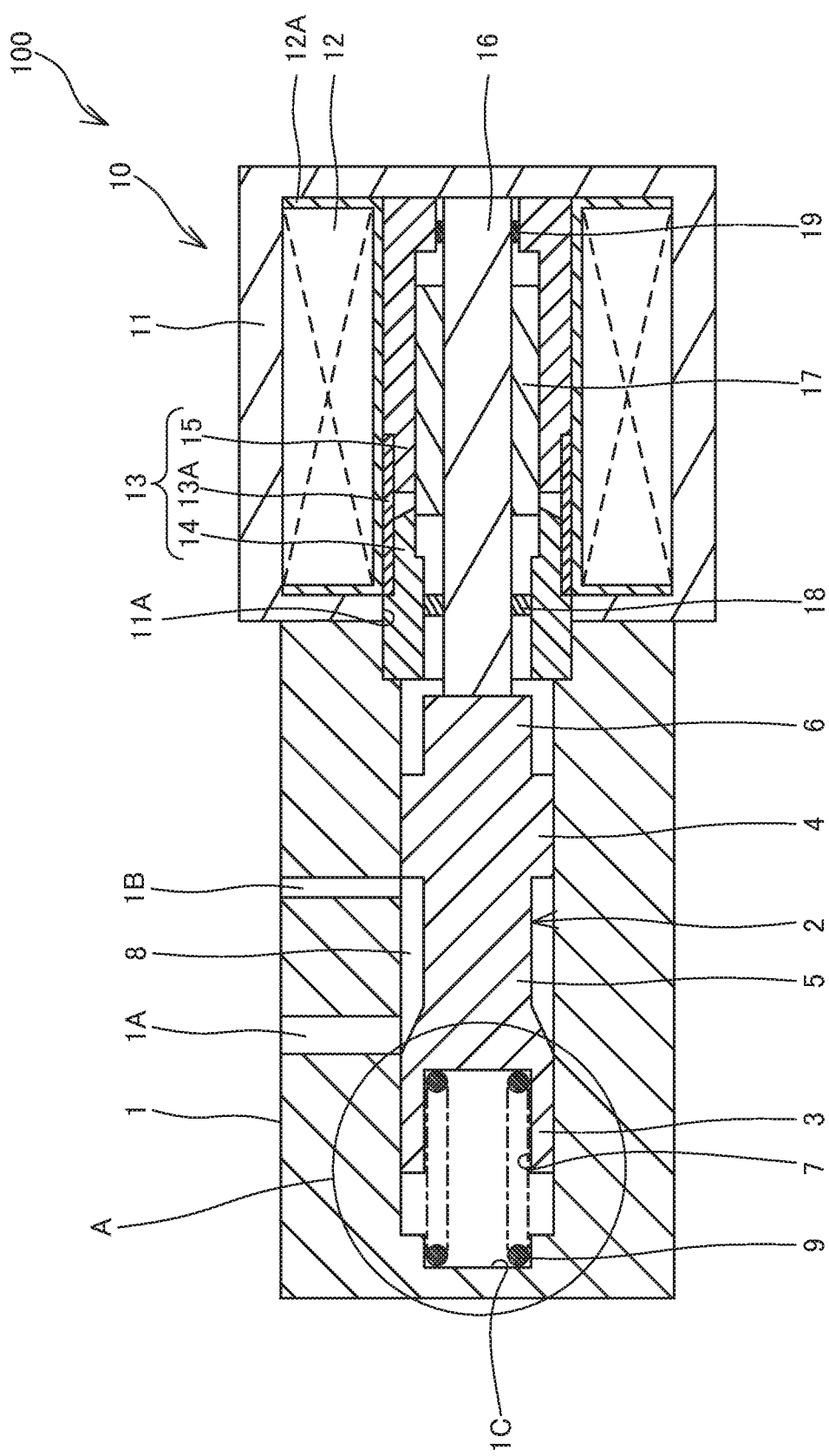
FIG. 1 is a sectional view of a solenoid valve according to a first embodiment of the present invention.

As illustrated in FIG. 1, the solenoid valve 100 is provided with a housing 1 that has a bottomed cylindrical shape, a spool 2 that is provided inside the housing 1 to be able to move along the axial direction, and a coil spring 9 that is provided inside the housing 1 and that serves as a spring member biasing the spool 2.

In the housing 1, an inflow path 1A and an outflow path 1B, as valve paths through which the hydraulic oil flows, are formed next to each other along the axial direction. The inflow path 1A communicates with the inside of the housing 1, and communicates with the fluid pressure source via a not-illustrated pipe or the like. The outflow path 1B communicates with the inside of the housing 1, and communicates with a hydraulic machine or the like via a not-illustrated pipe or the like.

The spool 2 has a first land part 3 and a second land part 4 that slide along the inner peripheral surface of a housing 1, a small-diameter part 5 that has a smaller outer diameter than those of the first land part 3 and the second land part 4 and that couples the first land part 3 and the second land part 4, and a tip end part 6 that comes in contact with a later-described shaft 16 of a solenoid part 10.

A spring housing recessed part 7 that houses a part of the coil spring 9 is formed at the end of the first land part 3. The second land part 4 slides along the inner peripheral surface of the housing 1, and adjusts an opening degree of the outflow path 1B.

The small-diameter part 5, formed to have the smaller diameter than the outer diameters of the first land part 3 and the second land part 4, forms an annular fluid chamber 8 between the small-diameter part 5 and the inner peripheral surface of the housing 1. The fluid chamber 8 communicates with the inflow path 1A and the outflow path 1B, and guides the hydraulic oil passing through the inflow path 1A to the outflow path 1B.

The coil spring 9 is interposed in a compressed state between the spring housing recessed part 7 of the first land part 3 of the spool 2 and a bottom part 1C of the housing 1. The coil spring 9 biases the spool 2 in the direction with which the second land part 4 opens the outflow path 1B (right direction in FIG. 1).

The solenoid valve 100 is further provided with the solenoid part 10 that drives the spool 2 in the axial direction.

The solenoid part 10 has a yoke 11 that is formed by a magnetic substance, a coil 12 that produces a magnetic force when a current passes therethrough, a stator core 13 that is provided inside the coil 12 and that is excited by the magnetic force of the coil 12, the shaft 16 that is movable along the axial direction together with the spool 2, and a plunger 17 that is fixed to the outer periphery of the shaft 16.

The yoke 11 is formed to have a bottomed cylindrical shape, and is abutted against and fixed to the end surface of the housing 1 on the opening side. In the end surface of the yoke 11 abutting against the housing 1, an opening part 11A through which the stator core 13 is inserted is formed.

The coil 12 is molded by a resin material 12A, and is provided inside the yoke 11. The coil 12 produces a magnetic force when a current is supplied via a terminal (not illustrated).

The stator core 13 is a cylindrical member provided inside the coil 12. The stator core 13 is formed by a first stator core 14 that is inserted through the opening part 11A of the yoke 11 and that is partly housed inside the housing 1, a second stator core 15 that is arranged in series with the first stator core 14 with space therebetween, and a coupling member 13A that couples the outer peripheries of the first stator core 14 and the second stator core 15. The first stator core 14 and the second stator core 15 are formed by a magnetic substance, and the coupling member 13A is formed by a nonmagnetic substance.

The shaft 16 is supported to be able to slide in the axial direction, by a first bearing 18 that is provided on the inner periphery of the first stator core 14 and a second bearing 19 that is provided on the inner periphery of the second stator core 15. The tip end of the shaft 16 comes in contact with the tip end part 6 of the spool 2. Thereby, the spool 2 moves together with the movement of the shaft 16.

The plunger 17 is formed by a magnetic substance. The plunger 17 is fixed to the shaft 16 by swaging or the like, in order to avoid misalignment with respect to the shaft 16. Between the plunger 17 and the first stator core 14, an adsorption force acts on the plunger 17 toward the direction approaching the first stator core 14, by a magnetic force of the coil 12.

Next, the operation of the solenoid valve 100 will be explained.

Figure 2:
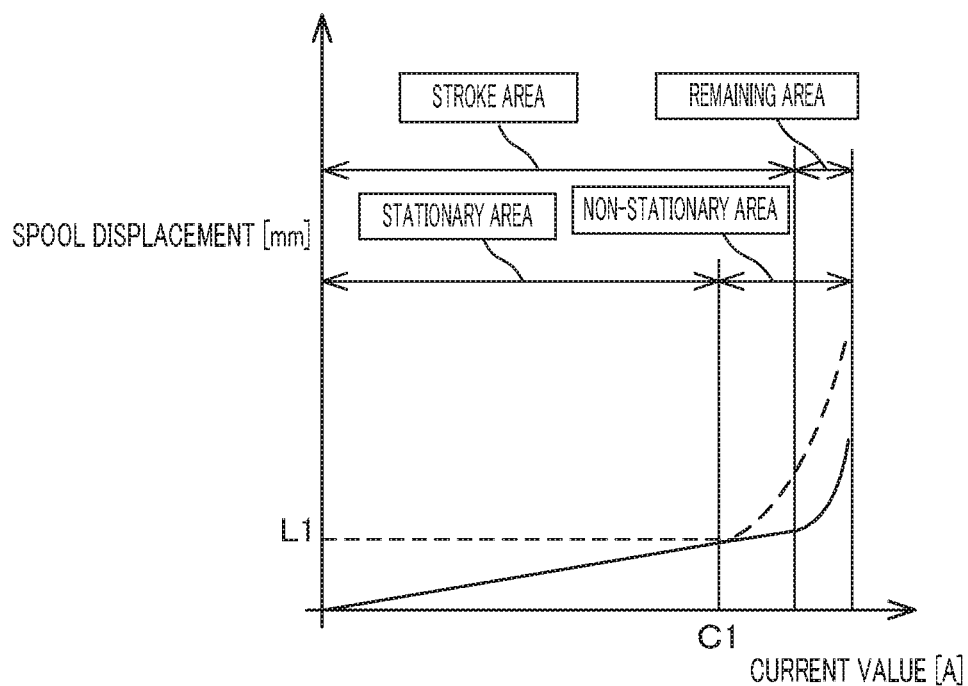
FIG. 2 is a graph illustrating the relationship between a current value passing through a coil in the solenoid valve according to the first embodiment of the present invention and spool displacement.

FIG. 2 is a graph illustrating the relationship between a displacement amount of the spool 2 in the direction compressing the coil spring 9 (left direction in FIG. 1) and a current value passing through the coil 12, on the basis of the position of the spool 2 under an unenergized state as illustrated FIG. 1.

Under the unenergized state where a current does not pass through the coil 12, the adsorption force does not act on the plunger 17, and hence the spool 2 is biased in the direction opening the outflow path 1B (right direction in FIG. 1) by the biasing force of the coil spring 9. Therefore, as illustrated in FIG. 1, the inflow path 1A and the outflow path 1B are caused to communicate via the fluid chamber 8, and the passage of the hydraulic oil is permitted. Namely, the solenoid valve 100 is a normal open type in which the inflow path 1A and the outflow path 1B are caused to communicate with each other under the unenergized state. The solenoid valve 100 is not limited to the normal open type, and may be a normal close type.

When a current passes through the coil 12 and the magnetic force is produced, the plunger 17 is excited, and the adsorption force acts on the plunger 17 in the direction approaching the first stator core 14 (left direction in FIG. 1). Namely, the force in the direction compressing the coil spring 9 acts on the spool 2 via the shaft 16.

The spool 2 moves to the position where the adsorption force acting via the shaft 16 and the biasing force by the coil spring 9 are in balance. As the amount of the current energizing the coil 12 increases, the adsorption force between the plunger 17 and the first stator core 14 increases. Namely, as illustrated in FIG. 2, as a current value energizing the coil 12 increases, the spool 2 moves in the direction compressing the coil spring 9 against the biasing force of the coil spring 9.

When the current value energizing the coil 12 is increased and the spool 2 is moved against the biasing force of the coil spring 9, the outflow path 1B is gradually closed by the second land part 4. This causes a reduction in an opening area of the outflow path 1B relative to the fluid chamber 8. Thus, the flow rate of the hydraulic oil guided from the fluid chamber 8 via the outflow path 1B is reduced.

When the current value energizing the coil 12 is increased further and a moving amount of the plunger 17 in the axial direction toward the first stator core 14 is increased, the outflow path 1B is fully closed by the second land part 4. Thus, the communication between the inflow path 1A and the outflow path 1B is blocked.

Thus, the solenoid valve 100 adjusts the flow rate of the hydraulic oil guided from the inflow path 1A to the outflow path 1B by controlling the current value energizing the coil 12 and by moving the spool 2 in the axial direction.

Next, the concrete structure and the operation of the coil spring 9 will be explained mainly with reference to FIG. 2 to FIG. 5.

Figure 3:
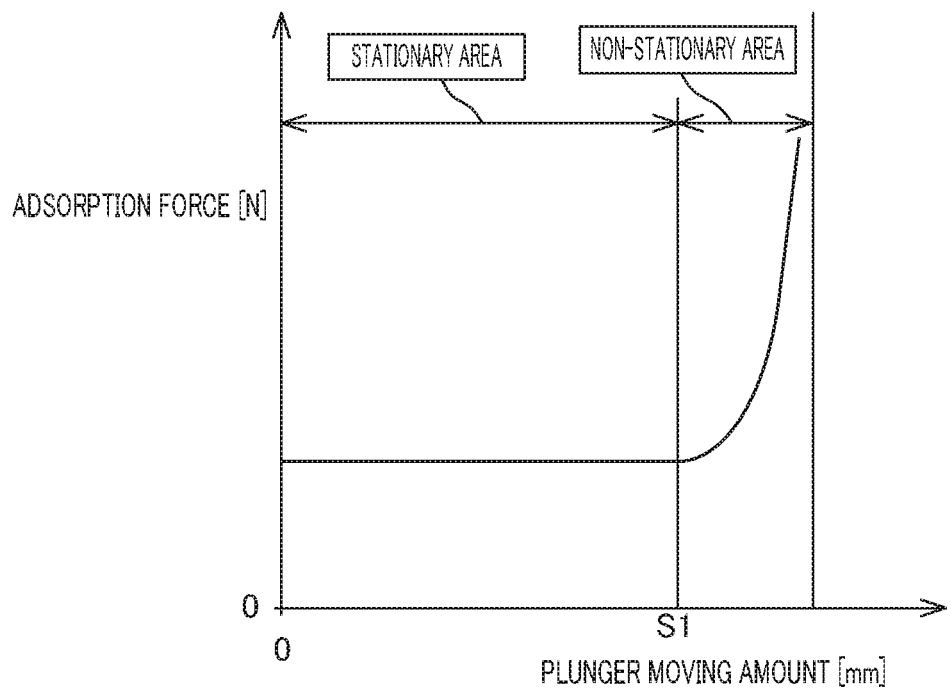
FIG. 3 is a graph illustrating the relationship between a moving amount of the plunger in the solenoid valve according to the first embodiment of the present invention and an adsorption force.
Figure 4:
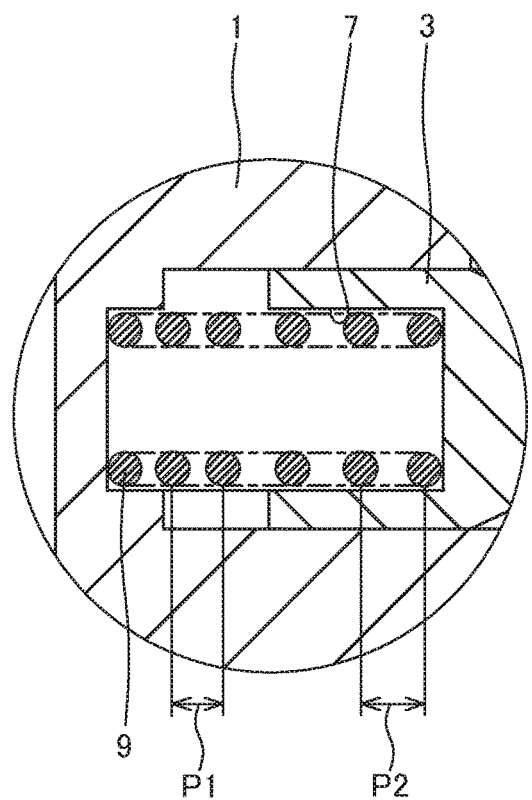
FIG. 4 is an enlarged view of an A part in FIG. 1.
Figure 5:
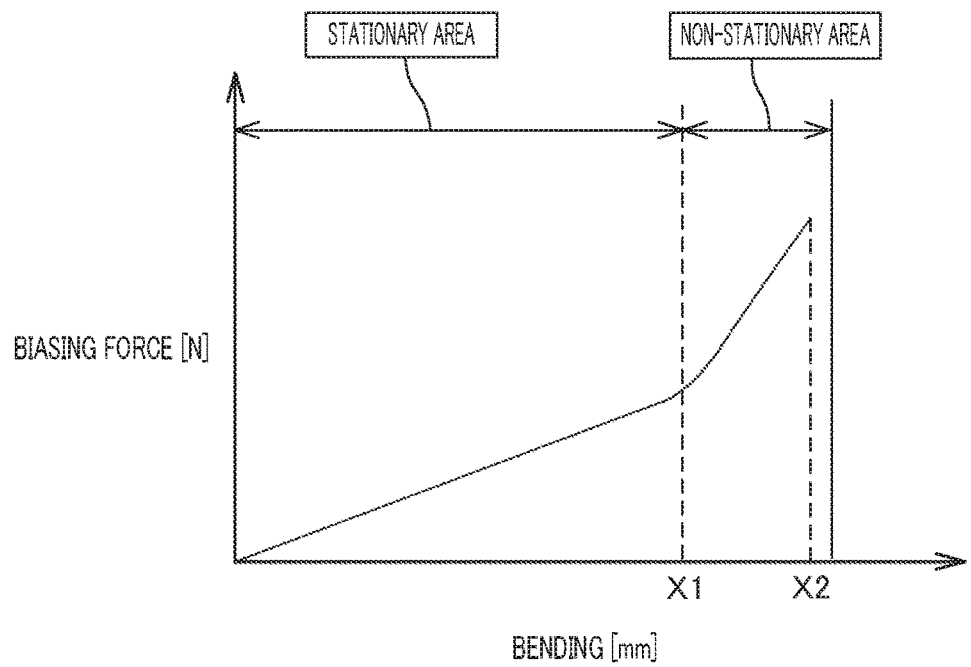
FIG. 5 is a view illustrating a spring characteristic of a spring member in the solenoid valve according to the first embodiment of the present invention.

FIG. 3 is a graph illustrating the relationship between the moving amount of the plunger 17 toward the first stator core 14 and the adsorption force. FIG. 4 is an enlarged view of an A part in FIG. 1, and FIG. 5 is a view illustrating a spring characteristic of the coil spring 9.

Figure 8:
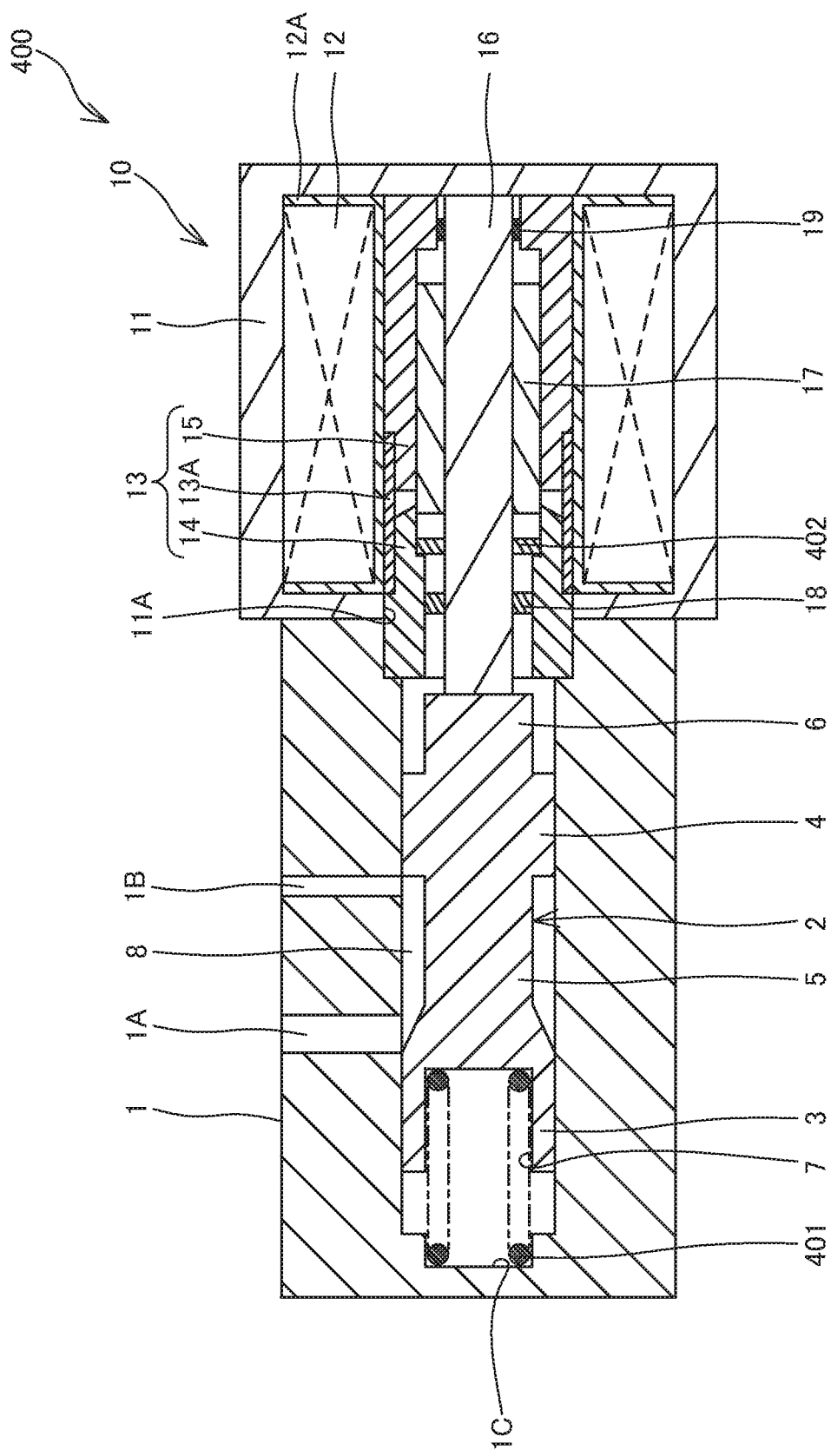
FIG. 8 is a view illustrating a comparative example of a solenoid valve according to the first embodiment of the present invention.

As a comparative example, an explanation will be given to a solenoid valve 400 with reference to FIG. 8, in which a linear spring 401, having such a spring characteristic that bending and a load are in proportion to each other, is used as a spring member.

With the solenoid valve 400, from a viewpoint of controllability, the characteristic of the coil 12 is set in such a manner that the adsorption force acting on the plunger 17 is almost constant relative to the moving amount of the plunger 17 toward the first stator core 14. By setting the characteristic of the coil 12 like this, the position of the spool 2 can generally be controlled in a proportional manner by the current value energizing the coil 12. This facilitates the control of the solenoid valve 400.

However, even when the characteristic or the like of the coil 12 is set in such a manner that the adsorption force becomes constant without depending on the moving amount of the plunger 17, the adsorption force between the plunger 17 and the first stator core 14 may increase rapidly, as illustrated in FIG. 3, in the case where the plunger 17 and the first stator core 14 approach to the position immediately before abutment. Hereinafter, the area where the adsorption force is constant irrespective of the moving amount of the plunger 17 is referred to as the "stationary area", and the area where the adsorption force increases rapidly in the vicinity of the position where the plunger 17 abuts against the first stator core 14 is referred to as the "non-stationary area". Further, the moving amount of the plunger 17 at the time of changing from the stationary area to the non-stationary area is defined as "S1", the displacement of the spool 2 at this time is defined as "L1", and the current value passing through the coil 12 is defined as "C1".

Even when the plunger 17 moves slightly in the non-stationary area, the adsorption force between the plunger 17 and the first stator core 14 increases rapidly. Namely, in the non-stationary area, the force acting on the spool 2 increases rapidly and the position of the spool 2 changes substantially, even when the current value energizing the coil 12 is increased and the moving amount of the plunger 17 slightly changes, as illustrated by a broken line in FIG. 2. Therefore, in the non-stationary area, the position of the spool 2 cannot be controlled proportionally by the current value, contrary to the case in the stationary area, and it is difficult to control the current value energizing the coil 12.

Therefore, with the solenoid valve 400, a spacer 402 is provided between the plunger 17 and the first stator core 14 in order to prevent the plunger 17 from moving to the non-stationary area. Namely, with the solenoid valve 400, a stroke area in which the plunger 17 moves toward the first stator core 14 is formed by the stationary area only.

Meanwhile, with the solenoid valve 100, a variable pitch spring whose spring pitch is not constant is used as the coil spring 9, as illustrated in FIG. 4. With the coil spring 9, a pitch P1 on the side of the bottom of the housing 1 is smaller, and a pitch P2 on the side of the spring housing recessed part 7 of the spool 2 is larger than P1.

As illustrated in FIG. 5, the coil spring 9 has such a nonlinear spring characteristic that a spring constant increases when the bending becomes more than bending X1 as a threshold value. With the coil spring 9, the bending X1 at the time when the spring constant changes is set to be the bending of the coil spring 9 when the moving amount of the plunger 17 becomes S1, that is, when the displacement of the spool 2 becomes L1.

Further, the coil spring 9 is formed in such a manner that it becomes the most contracted state and the bending becomes the maximum value X2, immediately before the plunger 17 abuts against the first stator core 14 after moving toward the first stator core 14.

As the coil spring 9 has the nonlinear spring characteristic like this, the biasing force by which the spool 2 is biased by the coil spring 9 increases as the adsorption force increases in the non-stationary area. Therefore, the rapidly increasing adsorption force can be canceled by the biasing force of the coil spring 9. In other words, the spring constant of the coil spring 9 is set in such a manner that the adsorption force by the amount increased from the adsorption force in the stationary area is canceled in the non-stationary area and the adsorption force acting on the shaft 16 becomes apparently the same as the adsorption force in the stationary area.

For this reason, even when the plunger 17 moves in the non-stationary area, it is possible to avoid the increase in the force acting on the spool 2. Namely, as the movement of the plunger 17 is possible to the vicinity of the position where the plunger 17 abuts against the first stator core 14, it is possible to use not only the stationary area but also a part of the non-stationary area as the stroke area of the plunger 17, as illustrated by a solid line in FIG. 2.

Immediately before the abutment of the plunger 17 and the first stator core 14, a remaining area may be caused where the increasing adsorption force cannot be canceled even by the coil spring 9 having the nonlinear spring characteristic (refer to FIG. 2). However, the coil spring 9 is formed to be the most contracted state immediately before the plunger 17 abuts against the first stator core 14, and hence further movement of the plunger 17 toward the first stator core 14 is limited. Thus, the plunger 17 does not move to the remaining area, and the control of the solenoid valve 100 can be made with ease.

The following effects can be obtained by the above-described first embodiment.

With the solenoid valve 100, when the adsorption force increases as the plunger 17 approaches the first stator core 14 and moves to the position immediately before abutment, the spring constant of the coil spring 9 increases, and thus the adsorption force which is increased by the movement of the plunger 17 can be canceled by the biasing force of the coil spring 9. For this reason, even when the plunger 17 moves to the vicinity of the position where it abuts against the first stator core 14, the force acting on the spool 2 does not increase rapidly. Thus, the controllability is not deteriorated even in the vicinity of the position where the plunger 17 abuts against the first stator core 14, and the plunger 17 can be moved to the vicinity of the position where it abuts against the first stator core 14. This makes it possible to reduce the useless movable area of the plunger 17 in the solenoid valve 100.

As the useless movable area of the plunger 17 can be reduced, the solenoid valve 100 can be downsized.

As it is not necessary to provide the spacer 402 between the plunger 17 and the first stator core 14 in order to prevent the plunger 17 from moving to the vicinity of the position where it abuts against the first stator core 14, it is possible to reduce a number of parts and to reduce costs.

The coil spring 9 is formed to be the most contracted state immediately before the plunger 17 abuts against the first stator core 14 after moving toward the first stator core 14. Therefore, it is possible to prevent the plunger 17 from moving to the remaining area of the non-stationary area.

The solenoid valve 100 according to the first embodiment produces the constant adsorption force in the stationary area, irrespective of the moving amount of the plunger 17. However, the adsorption force in the stationary area may not be constant with some solenoid valves. In this case, the spring characteristic of the coil spring 9 can be set in such a manner that the adsorption force increased in the non-stationary area is canceled and the apparently-constant adsorption force is caused to act on the shaft 16, and at the same time, the apparently-constant adsorption force is caused to act on the shaft 16 also in the stationary area.

According to the first embodiment, the variable pitch spring having the nonlinear spring characteristic is used as the coil spring 9. Instead of this, other springs having the nonlinear spring characteristic such as a taper-coil spring may be used as the coil spring 9.

(Second Embodiment)

Figure 6:
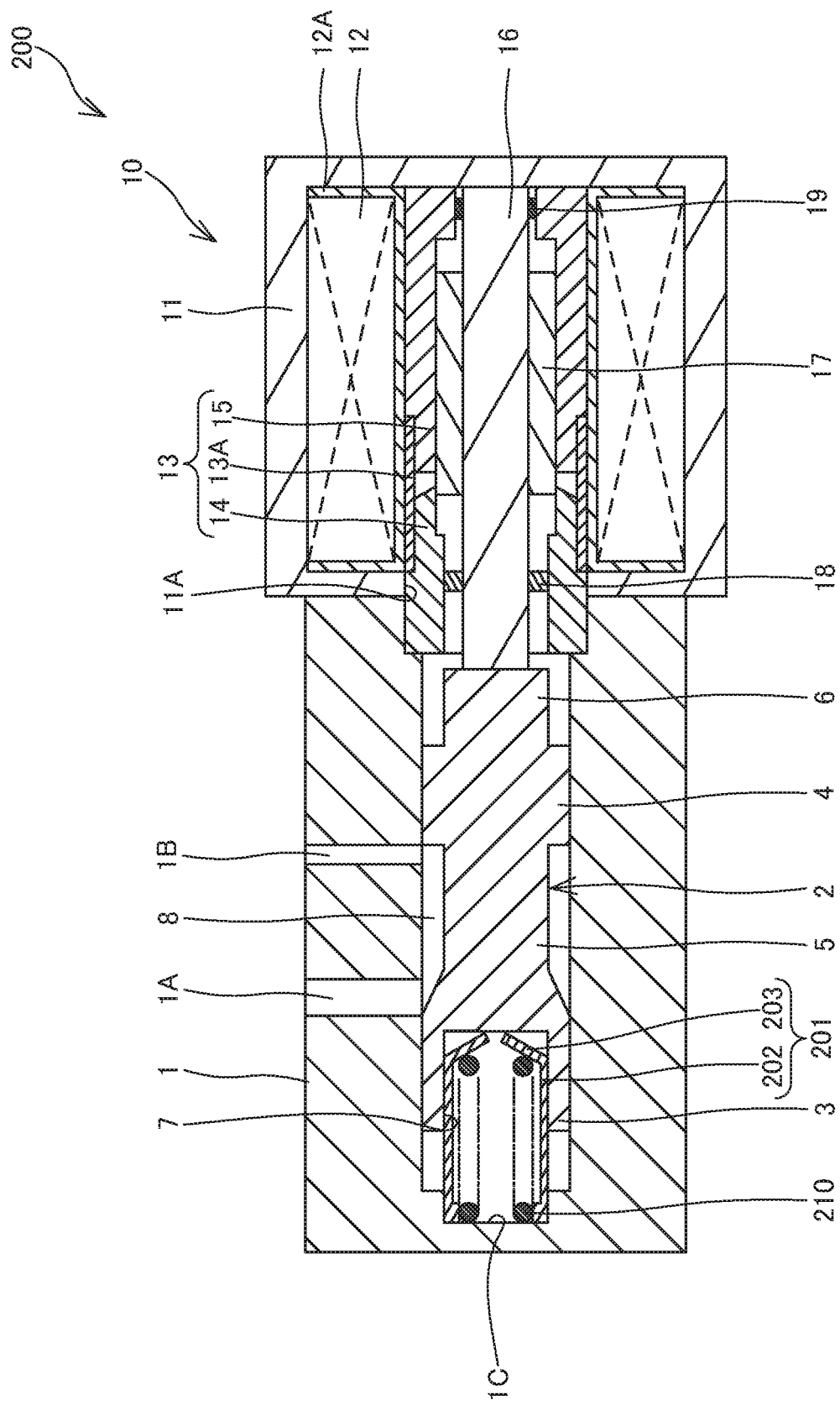
FIG. 6 is a sectional view of a solenoid valve according to a second embodiment of the present invention.

Next, a solenoid valve 200 according to a second embodiment of the present invention will be explained with reference to FIG. 6. Hereinafter, an explanation will be given mainly to the differences from the above-described embodiment, by giving the same numerals and symbols to designate the same structures as those in the solenoid valve 100 of the first embodiment, and by omitting the explanations thereof.

According to the above-described first embodiment, the coil spring 9 as the variable pitch spring is used as the spring member of the solenoid valve 100. Meanwhile, the solenoid valve 200 according to the second embodiment is different from the solenoid valve 100 according to the first embodiment in that a cylindrical elastic member 201 having a cylindrical shape is provided, as illustrated in FIG. 6.

The spring member in the solenoid valve 200 has the cylindrical elastic member 201, and a linear spring 210 that is provided inside the cylindrical elastic member 201 and that has a linear spring characteristic.

The cylindrical elastic member 201 is a member that has a nonlinear spring characteristic and that is made of metal. The cylindrical elastic member 201 may not be made of metal, and may be made of resin, as long as the biasing force can be exerted. The cylindrical elastic member 201 has a cylindrical part 202 that has a cylindrical shape, and an elastic part 203 that is coupled to the cylindrical part 202, that extends toward the inside of the cylindrical part 202, and that bends in the axial direction.

One end of the cylindrical part 202 is housed in the bottom part 1C of the housing 1, and the other end is housed in the spring housing recessed part 7 of the spool 2. The elastic part 203 that comes in contact with the bottom of the spring housing recessed part 7 is coupled to the other end of the cylindrical part 202.

The elastic part 203 is an annular member formed in a disc spring shape and having a nonlinear spring characteristic, and comes in contact with the bottom of the spring housing recessed part 7 while being bent in the axial direction. As the elastic part 203 bends in the axial direction, the spool 2 is biased in the direction opening the outflow path 1B.

The linear spring 210 has such a linear spring characteristic that a bending amount and a load are in primary proportion. The linear spring 210 is provided inside the cylindrical part 202 in the cylindrical elastic member 201, and is brought into contact with the inside of the elastic part 203. Therefore, when the elastic part 203 bends in the axial direction, the linear spring 210 also bends and exerts the biasing force on the spool 2.

The spring member in the solenoid valve 200 has a nonlinear spring characteristic in which the spring characteristics of the linear spring 210 and the elastic part 203 in the cylindrical elastic member 201 are combined.

Similarly to the coil spring 9 in the solenoid valve 100 according to the first embodiment, thus-combined spring characteristic of the solenoid valve 200 cancels the adsorption force in the non-stationary area by the amount increased from the adsorption force in the stationary area. Thus, the spring characteristic of the spring member in the solenoid valve 200 is set to have such a spring constant that the adsorption force acting on the spool 2 becomes apparently the same as the adsorption force in the stationary area.

With the cylindrical elastic member 201, the elastic part 203 is formed to bend in the axial direction and becomes perpendicular to the axis of the cylindrical part 202, before the plunger 17 abuts against the first stator core 14. As the elastic part 203 bends to become perpendicular to the axis of the cylindrical part 202, the movement of the spool 2 toward the cylindrical elastic member 201, that is, the movement of the plunger 17 toward the first stator core 14 is limited, as a result of which the abutment between the plunger 17 and the first stator core 14 can be avoided.

According to the above-described solenoid valve 200 of the second embodiment, the same effects as those of the first embodiment can be obtained.

With the solenoid valve 200, the linear spring 210 is provided inside the cylindrical elastic member 201. Instead of this, it is possible to provide a variable pitch spring or the like which has a nonlinear spring characteristic, inside the cylindrical elastic member 201. The spring may not be provided inside the cylindrical elastic member 201 and in this case, the spring characteristic of the elastic part 203 may be set in such a manner that the adsorption force can be canceled by the amount increased in the non-stationary area.

According to the second embodiment, the elastic part 203 is formed by the annular member. However, it may not have the annular shape, and may be formed as tabs, that is, a plurality of plate members extending from the cylindrical part 202 to the inside. In this case, the length and the like of each plate member may be changed to set the spring characteristic freely.

(Third Embodiment)

Figure 7:
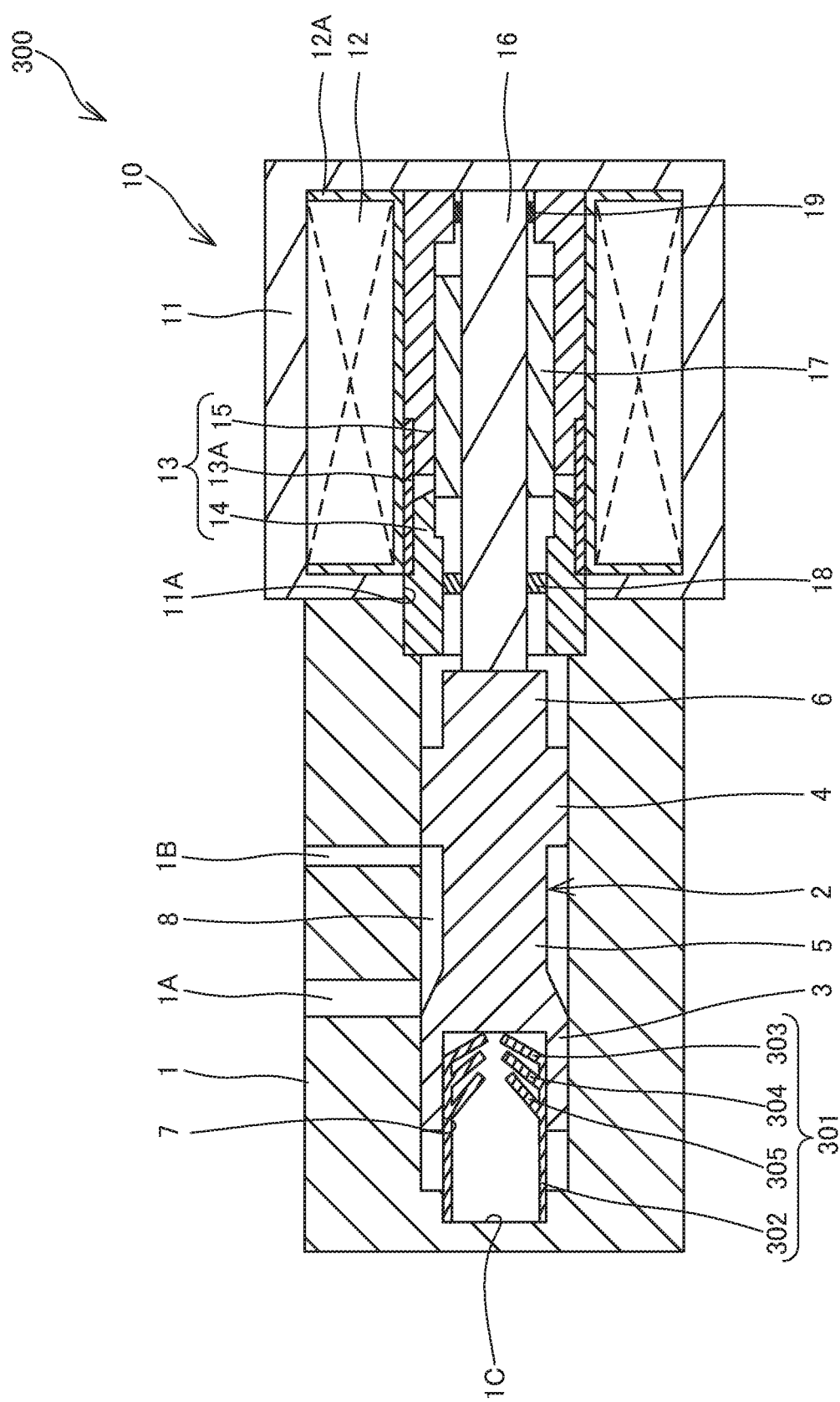
FIG. 7 is a sectional view of a solenoid valve according to a third embodiment of the present invention.

Next, a solenoid valve 300 according to a third embodiment of the present invention will be explained with reference to FIG. 7. Hereinafter, an explanation will be given mainly to the differences from the above-described second embodiment, by giving the same numerals and symbols to designate the same structures as those in the solenoid valve 200 of the second embodiment, and by omitting the explanations thereof.

According to the above-described second embodiment, the spring member of the solenoid valve 200 has the cylindrical elastic member 201 that has one elastic part 203, and the linear spring 210 that has the linear spring characteristic. Meanwhile, the solenoid valve 300 according to the third embodiment is different from the solenoid valve 200 according to the second embodiment in that the spring member is formed by a cylindrical elastic member 301 having a plurality of elastic parts, as illustrated in FIG. 7.

The cylindrical elastic member 301 in the solenoid valve 300 has a cylindrical part 302 and elastic parts that are coupled to the cylindrical part 302, that extend to the inside of the cylindrical part 302, and that bend in the axial direction.

The solenoid valve 300 has, as the elastic parts, a first elastic part 303 that is provided at the end of the cylindrical part 302 and that comes in contact with the bottom of the spring housing recessed part 7, a second elastic part 304 that is provided inside the cylindrical part 302 and that comes in contact with the first elastic part 303 when the first elastic part 303 bends, and a third elastic part 305 that is provided inside the cylindrical part 302 and that comes in contact with the second elastic part 304 when the second elastic part 304 bends.

With the cylindrical elastic member 301 having the first, second, and third elastic parts 303, 304, and 305 like this, only the force by the bending of the first elastic part 303 acts on the spool 2 as the biasing force, when the coil 12 is unenergized. When the coil 12 is energized, the spool 2 moves, and the first elastic part 303 bends in the axial direction, the first elastic part 303 and the second elastic part 304 are brought into contact with each other, and hence the biasing force of the spring characteristic which is obtained by combining the spring characteristics of the first elastic part 303 and the second elastic part 304 acts on the spool 2. When the spool 2 moves further, the second elastic part 304 and the third elastic part 305 are brought into contact with each other, and hence the biasing force of the spring characteristic which is obtained by combining the spring characteristics of the first elastic part 303, the second elastic part 304, and the third elastic part 305, acts on the spool 2. As the spool 2 moves against the biasing force of the cylindrical elastic member 301, the number of the elastic parts that bend in the axial direction and exert the biasing force increases, as a result of which the cylindrical elastic member 301, as a whole, exerts the nonlinear spring characteristic.

With the solenoid valve 300, the spring characteristic of the cylindrical elastic member 301 as a whole, in which the spring characteristics of the three elastic parts are combined, is set so as to exert the biasing force that cancels the adsorption force increased in the non-stationary area.

Further, the cylindrical elastic member 301 is formed in such a manner that the first elastic part 303 bends in the axial direction and becomes perpendicular to the axis of the cylindrical part 302, before the plunger 17 abuts against the first stator core 14.

Therefore, the same effects as those of the second embodiment can be obtained by the solenoid valve 300 according to the third embodiment.

As the spring characteristic of the cylindrical elastic member 301 in the solenoid valve 300 is obtained by combining the spring characteristics of the three elastic parts, various spring characteristics can be realized for the cylindrical elastic member 301 as a whole, by freely changing the respective spring characteristics.

According to the third embodiment, the cylindrical elastic member 301 has the three elastic parts, but it may have two elastic parts, or four or more elastic parts.

According to this embodiment, each elastic part of the cylindrical elastic member 301 is formed to have an annular shape. However, it may not have the annular shape, and each elastic part may be formed by a plurality of plate members, similarly to the second embodiment.

The embodiments of the present invention described above are merely illustration of some application examples of the present invention and not of the nature to limit the technical scope of the present invention to the specific constructions of the above embodiments.

According to the above-described embodiments, the spool 2, the shaft 16, and the plunger 17 are formed separately. Instead of this, the shaft 16 and the plunger 17 may be formed integrally, or the spool 2 and the shaft 16 may be formed integrally. Further, all of the spool 2, the shaft 16, and the plunger 17 may be formed integrally.

According to the above-described embodiments, the magnetic force which is produced by energizing the coil 12 causes the adsorption force toward the first stator core 14 to act on the plunger 17, and then the shaft 16 moves from the solenoid part 10 toward the housing 1 against the biasing force of the spring member. Instead of this, the spring member may bias the shaft 16 or the spool 2 in the direction causing the shaft 16 to move toward the housing 1, and the adsorption force toward the second stator core 15 may be caused to act on the plunger 17 by energizing the coil 12. In this case, the shaft 16 moves from the housing 1 toward the solenoid part 10 by energizing the coil 12.

The present application claims a priority based on Japanese Patent Application No. 2014-140621 filed with the Japan Patent Office on Jul. 8, 2014, all the contents of which are hereby incorporated by reference.

The invention claimed is:

1. A solenoid valve for controlling a flow rate of a working fluid, comprising:
    a housing having a valve path in which the working fluid flows;
    a spool movably provided inside the housing and configured to adjust an opening degree of the valve path;
    a coil configured to produce a magnetic force when a current passes therethrough;
    a stator core provided inside the coil and configured to be excited by the magnetic force of the coil;
    a shaft configured to be movable along an axial direction together with the spool;
    a plunger fixed to the shaft and configured to move in the axial direction by adsorption force acting an between the plunger and the stator core by the magnetic force of the coil; and
    a spring member, having a nonlinear spring characteristic, configured to bias the spool against the movement of the plunger, wherein
    a spring constant of the spring member increases as the adsorption force increases by the movement of the plunger,
    the spring member comprises a cylindrical elastic member formed in a cylindrical shape, and
    the cylindrical elastic member comprises a cylindrical part having a cylindrical shape, and an elastic part coupled to the cylindrical part and extending toward an inner side of the cylindrical part to bend in the axial direction, and biases the spool when the elastic part bends in the axial direction.

2. The solenoid valve according to claim 1, wherein the spring member comprises a variable pitch spring.

3. The solenoid valve according to claim 1,
    wherein the cylindrical elastic member comprises a plurality of the elastic parts, and
    wherein a number of the elastic parts bending in the axial direction increases, as the adsorption force acting on the plunger increases by the plunger and the stator core approaching each other.

4. The solenoid valve according to claim 1, wherein the cylindrical elastic member is formed to limit the movement of the plunger toward the stator core, while the elastic part brought into contact with the spool is bent to become perpendicular to an axis of the cylindrical part.

* * * * *